United States Patent [19]

Marques, Jr.

[11] Patent Number: 4,470,733

[45] Date of Patent: Sep. 11, 1984

[54] MULTIPLE FUNCTION CUTTING TOOL

[75] Inventor: John Marques, Jr., Acushnet, Mass.

[73] Assignee: Gulf & Western Manufacturing Company, Southfield, Mich.

[21] Appl. No.: 405,800

[22] Filed: Aug. 6, 1982

Related U.S. Application Data

[63] Continuation-in-part of Ser. No. 150,525, May 16, 1980, abandoned.

[51] Int. Cl.³ .......................... B23C 5/10; B23C 5/12
[52] U.S. Cl. .................................. 408/230; 144/240; 407/54
[58] Field of Search .................... 408/230; 407/53, 54; 144/219, 220, 221, 240, 241

[56] References Cited

U.S. PATENT DOCUMENTS

| | | | |
|---|---|---|---|
| 1,963,611 | 6/1934 | Brumell et al. | 144/240 X |
| 2,360,425 | 10/1944 | Kinzbach . | |
| 2,778,252 | 1/1957 | Oxford, Jr. | 408/230 |
| 2,887,136 | 5/1959 | Rathzeber | 144/219 |
| 2,936,658 | 5/1960 | Riley | 408/230 |
| 2,965,144 | 12/1960 | Loewenthal | 144/219 X |
| 2,966,081 | 12/1960 | Kallio | 408/230 |
| 3,003,224 | 10/1961 | Ribich | 407/54 |
| 3,058,199 | 10/1962 | Cave et al. . | |
| 3,193,196 | 10/1965 | Maday | 407/54 |
| 3,514,827 | 6/1970 | Peace et al. . | |
| 3,667,857 | 6/1972 | Shaner et al. | 408/230 |
| 3,701,188 | 10/1972 | Wall et al. | 407/54 |
| 4,116,580 | 9/1978 | Hall et al. | 408/230 |

FOREIGN PATENT DOCUMENTS 345922  4/1931  United Kingdom ............... 408/230

Primary Examiner—Z. R. Bilinsky
Attorney, Agent, or Firm—A. Thomas Kammer

[57] ABSTRACT

An improved cutting tool is provided for performing a number of different cutting functions. A pair of radial cutting edges are provided for boring and chamfering. Peripheral cutting edges are provided for slotting and profile milling. Relatively shallow flutes having a large convex surface portion give the tool rigidity for all cutting operations.

15 Claims, 5 Drawing Figures

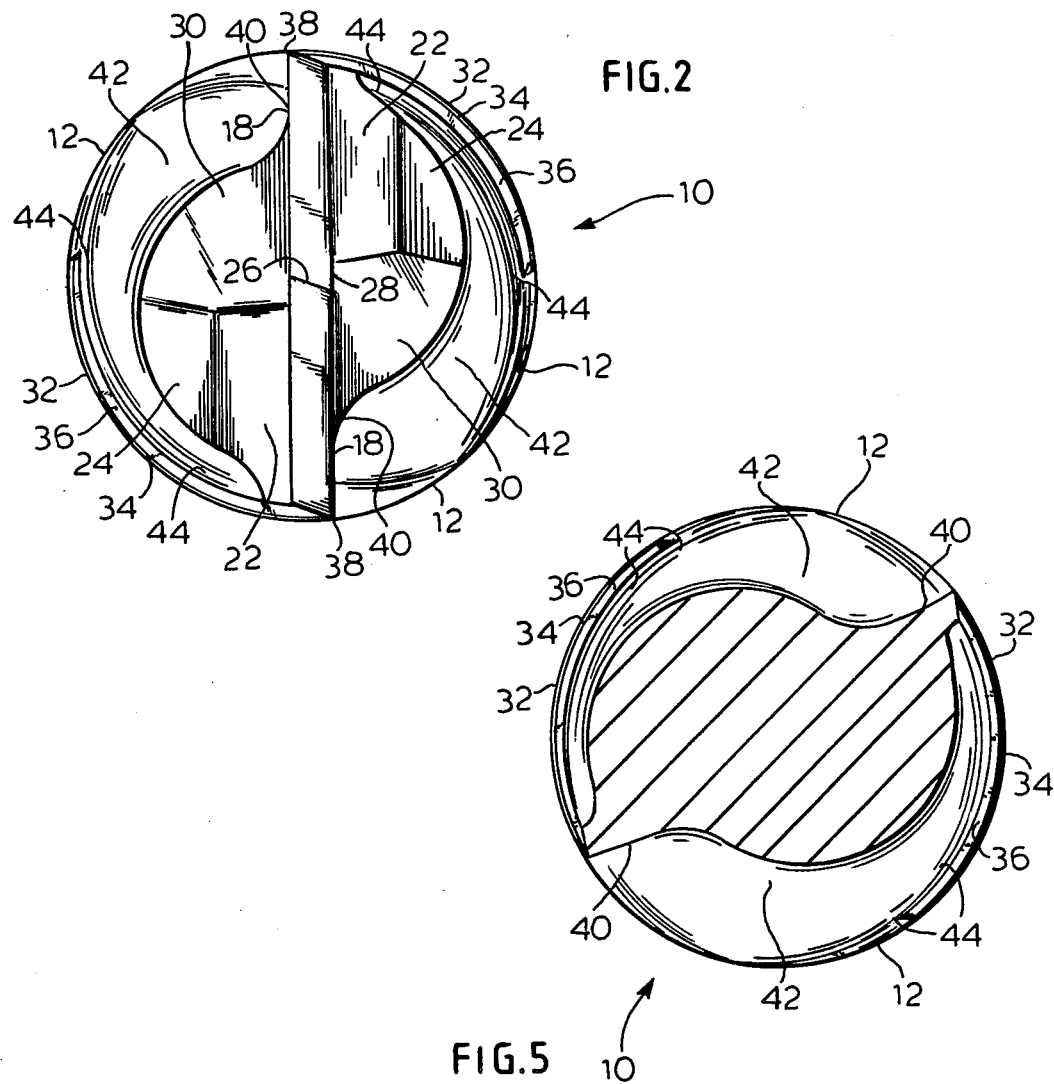

MULTIPLE FUNCTION CUTTING TOOL

CROSS REFERENCE TO RELATED APPLICATION

This application is a continuation-in-part of Ser. No. 150,525 filed May 16, 1980 now abandoned.

BACKGROUND OF THE INVENTION

Field of the invention

The field of the invention relates to cutting tools for performing a number of different cutting functions without necessitating retooling or the use of different cutting tool apparatuses.

Heretofore, boring and horizontal cutting operations required the use of at least two separate and distinct types of cutting tools. Boring operations, i.e. direct and vertical penetration into a substrate were typically performed by a twist drill bit powered by a conventional drill or drill press. Because of the configuration and placement of their cutting edges and flutes, twist drills are generally ineffective for cutting in directions anything other than vertically. Examples of conventional twist drills are described, for example, in U.S. Pat. Nos. 2,936,658 which issued to O. L. Riley on May 17, 1960; 2,778,252 which issued to C. J. Oxford, Jr. on Jan. 22, 1957; 2,966,081 which issued to W. J. Kallio on Dec. 27, 1960; and 4,116,580 which issued to R. F. Hall et al. on Sept. 26, 1978.

Horizontal cutting operations such as, for example, traverse cutting or slotting were typically performed by an end mill powered by the conventional milling machine. Generally, end mills include their cutting surfaces on the side surfaces of the tool in order to effect such operations. Typically, as exemplified by the milling tool described in U.S. Pat. No. 2,360,425 which issued to F. Kinzbach on Oct. 11, 1941, end mills will generally have square or ball noses which are inefficient for boring operations. Because of this inefficiency to bore or penetrate vertically, when a slot is to be cut in a substrate, a twist drill has been used to bore the initial hole and then an end mill is used to horizontally cut or groove.

A third type of cutting operation oftentimes required is a chamfering operation wherein the edges of a substrate are routed or angled or where a "V" shaped groove is to be cut in the substrate. Historically, this chamfering or grooving operation has been performed by tilting or angling conventional flat or square nose end mills to the desired angle to angularly cut. Such a technique, however, requires a milling machine with a rotatable head capable of cutting at an angle.

As can be readily appreciated, the fact that all three of these cutting operations either require different cutting tools or a special milling machine with a rotatable head, conventional cutting tools presently available are somewhat inefficient. A substantial amount of worker's time is required to change cutting tools and cutting tool apparatuses when different cuts are to be made and further necessitates the stocking of a number of different twist drills and end mills and apparatuses to power both. Further, with the advent and extensive use of numerically controlled (N.C.) milling and drilling operations, the manual changing of cutting tools and even the automatic indexing of machine turrets to effect these different operations reduces the benefits otherwise obtainable from such computerized automatic equipment. It is readily apparent that a single tool which can perform a number or all of these cutting functions and which is adaptable to N.C. milling and drilling operations offers numerous commercial advantages.

Attempts at combining a number of these cutting operations have been tried in the past. For example, U.S. Pat. No. 3,058,199 which issued to R. S. Cave et al. on Oct. 16, 1962 describes a cutting tool which combined the features of routing and milling cutters, both being essentially horizontal cutting operations. See also U.S. Pat. No. 3,667,857 which issued to M. W. Shaner et al. on June 6, 1972 for a combined twist drill and reamer cutting tool, both functions of which are boring operations. Applicant is, however, unaware of any commercially available cutting tool which is capable of effectively performing both vertical and horizontal cutting operations and which will further accomplish a chamfering operation.

Against the foregoing background, it is a primary objective of the present invention to provide a combination cutting tool which is capable of effectively performing horizontal and vertical cutting operations.

It is another objective of the present invention to provide a combination cutting tool capable of effectively performing boring, slotting and chamfering operations.

It is still another objective of the present invention to provide a combination cutting tool capable of performing horizontal and vertical cutting operations and which is compatible with numerically controlled milling and drilling equipment.

SUMMARY OF THE PRESENT INVENTION

To the accomplishment of the foregoing objectives and advantages, the present invention briefly comprises an improved cutting tool capable of effectively and interchangeably accomplishing boring, chamfering and horizontal cutting operations.

The cutting tool includes a substantially cylindrical body having a tip end including a pair of radial cutting edges which are inclined with respect to the axis of the tool and peripheral cutting edges extending along at least a part of the length of the body. The peripheral cutting edges are each separated by at least one flute.

Each of the radial cutting edges includes a primary relief surface. These surfaces intersect at the tip end to define a chisel tip. The radial cutting edges are inclined with respect to each other to permit internal and external chamfering.

Horizontal cutting is accomplished by means of the peripheral cutting edges. The flutes between these edges are shallow relative to the diameter of the cutting tool to provide greater tool rigidity so as to avoid tool chattering while cutting.

Vertical drilling is accomplished primarily by means of the radial cutting edges and the chisel tip. Though shallow, the flutes provide sufficient area to allow chip removal.

BRIEF DESCRIPTION OF THE DRAWINGS

FIG. 2 is an end view thereof;

FIG. 5 is a cross sectional view thereof taken along line 5—5 of FIG. 1.

DETAILED DESCRIPTION OF THE INVENTION

Figure 1:
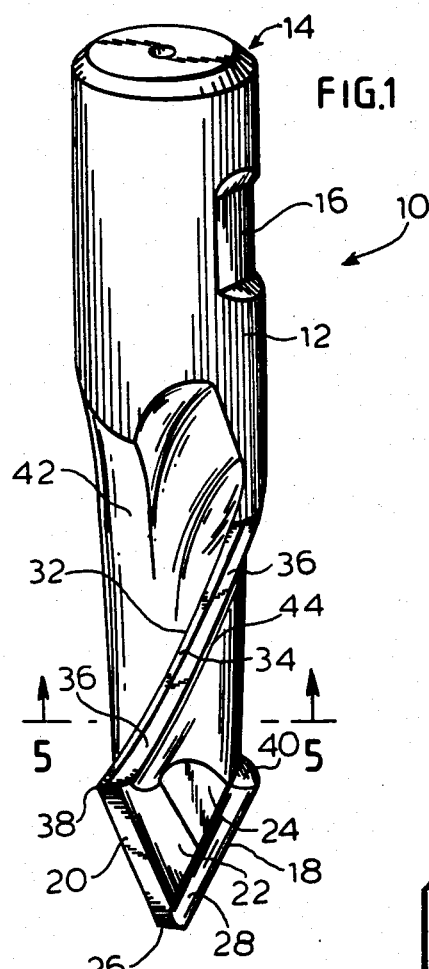
FIG. 1 is a perspective view of a cutting tool according to the invention.
Figure 3:
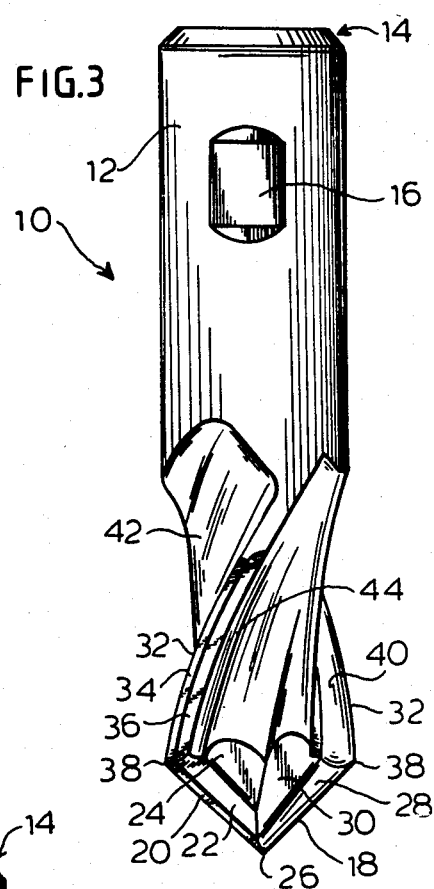
FIG. 3 is a side elevation view thereof.
Figure 4:
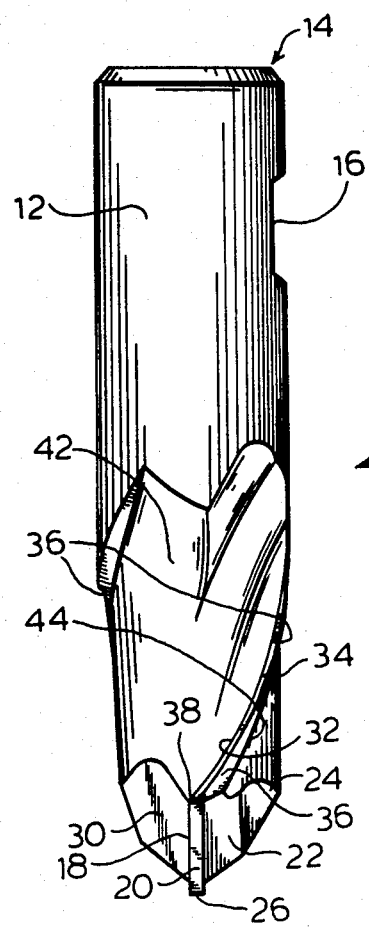
FIG. 4 is similar to FIG. 3, the cutting tool being rotated about ninety degrees.

The present invention provides a multiple function cutting tool referred to generally by reference numeral 10 in the drawings. The tool body has a substantially cylindrical configuration including a smooth shank 12 chamfered at its non-cutting end 14 for ease of installation into the chuck of a driver capable of rotating the tool about its longitudinal axis. A flat 16 is provided within the shank 12 for locking the tool within the chuck. The cutting tool 10 is made from high speed steel and may be used for cutting most materials, including ferrous and non-ferrous metals, plastics, and wood.

The cutting end of the tool includes first and second radial cutting edges 18. Each radial cutting edge is provided with trailing primary 20, secondary 22 and tertiary 24 clearances extending at successively larger angles with respect to a horizontal plane normal to the tool axis. The primary clearances 20 intersect along a line 26 which defines the tip of the tool. The included angle between the primary clearances and hence between the two radial cutting edges is ninety degrees. Other angles may alternatively be employed depending upon the chamfering requirements of the tool.

The line 26 of intersection between the above-mentioned primary clearances 20 defines a sharp edge hereinafter referred to as a chisel tip. The width of these clearances 20 decreases near the tip 26. The decrease is not evident in FIG. 2 due to its small size. This tip has the capability of commencing a boring operation upon rotation of the tool. The secondary clearances 22 do not adjoin the trailing edges of the respective primary clearances 20 near the chisel tip 26 to allow proper cutting by the radial cutting edges 18 and the chisel tip 26.

The radial cutting edges 18 are defined by lines of intersection between the respective primary clearances 20 and the respective leading flat surfaces 28. An acute angle is formed between these two surfaces giving the cutting edges 18 a positive axial rake angle.

The flat leading surfaces 28 each adjoin a substantially flat gash 30 which is inclined relative to the axis of the tool. An obtuse angle is formed therebetween. The gashes also respectively adjoin the respective secondary and tertiary clearances 22, 24 of the vertical cutting edges 18.

Peripheral cutting edges 32 are formed on the tool body for horizontal cutting operations. Each peripheral cutting edge includes a relatively small primary clearance 34 and a relatively large secondary clearance 36. The sizes of the primary clearances 34 are exaggerated in the drawings for purposes of illustration. The diameter of the tool at the peripheral cutting edges 32 exceeds the diameter as measured at the intersection of the primary and secondary clearances thereof.

Each peripheral cutting edge 32 extends helically about the axis of the tool. They adjoin the radial cutting edges 18 at the radially outermost portion thereof. The primary clearances 34 of the peripheral cutting edges 32 respectively adjoin the primary clearances 20 of the radial cutting edges. The secondary clearances 36 thereof respectively adjoin the respective primary and secondary clearances 20, 22 of the radial cutting edges. A pair of sharp points 38 are formed at the intersections of the respective radial and peripheral cutting edges. The latter extend approximately ninety degrees circumferentially about the tool before terminating near the shank 12. The radius of the tool as measured from the axis to the peripheral cutting edges 32 is substantially equal over the length of said edges (in contrast to twist drills where this radius decreases.)

During vertical cutting operations, it is important for the tool to be constructed in a manner which allows chip removal at a sufficient rate. Horizontal cutting operations such as slotting do not present a chip removal problem as there is sufficient space in the workpiece itself where the chips may be thrown. The rigidity of the tool becomes of paramount importance for this type of cutting. It is also important in chamfering.

The cutting tool 10 provided herein is constructed for both vertical and horizontal cutting. A pair of specially designed thirty degree helix angle right hand spiral flutes are provided between the peripheral cutting edges 32. Each includes a relatively small concave surface 40 which forms a leading wall for the cutting edge 32 with which it is associated. The peripheral cutting edges 32 are defined by the intersections of the concave surfaces 40 and the primary clearances 34. A positive radial rake angle is provided.

A smooth transition is made between each concave surface 40 and respective convex surfaces 42. The convex surface 42 is substantially larger than the concave portion throughout the length of the flute.

To provide the necessary rigidity for horizontal cutting, the flutes are relatively shallow with respect to the diameter of the tool defined by the peripheral cutting edges 32. They are considerably shallower than flutes ordinarily found in a twist drill. The tool is also substantially shorter than a conventional twist drill, again in the interest of rigidity.

The convex surface structure and the shallowness of the flutes gives the tool considerable rigidity and substantially prevents chattering. Sufficient area is, however, provided for chip removal. The convex surfaces respectively adjoin second smaller concave surfaces 44 which in turn adjoin the trailing edges of the peripheral secondary clearances 36.

The diameter of a hole drilled by the tool is determined by the distance between points 38. This distance is referred to as the outside diameter of the tool. The same size shank may be employed for tools of any of several outside diameters. For example, a three-eighths inch shank may be used in conjunction with tools having outside diameters ranging from one quarter to seven-sixteenths of an inch.

In operation, the tool is mounted to a tool holder for revolution at high speed. During a boring operation, the tool is advanced along its longitudinal axis into the workpiece. Chip removal is facilitated by the thirty degree spiral through which the flutes extend. This compensates for their shallowness.

Once a hole has been provided in the workpiece, traverse cutting may immediately begin by moving the tool perpendicular to its axis. The peripheral cutting edges are well supported by the tool body and chattering is not a problem.

Chamfering is accomplished by moving the cutting tool along the edge of a workpiece to allow the radial cutting edges to cut at a proper angle without requiring angling of the machine head.

What is claimed is:
1. A cutting tool comprising:
 a substantially cylindrical body having a first end, a second end, and a longitudinal axis;

a tip defined at said first end of said cylindrical body, said tip including a pair of radial cutting edges inclined with respect to said axis;

each radial cutting edge having at least primary and secondary clearances in trailing positions relative thereto;

said primary clearances of said respective radial cutting edges intersecting along a line which defines said tip;

first and second peripheral cutting edges extending about said cylindrical body, said first peripheral cutting edge joining one of said radial cutting edges at a first interface, said second peripheral cutting edge joining the other of said radial cutting edges at a second interface;

each peripheral cutting edge including both primary and secondary clearances in a trailing position relative thereto;

each of said peripheral cutting edges being separated by a spiral flute, each of said flutes including a relatively large convex portion trailing said peripheral cutting edges and a relatively small concave portion trailing said convex portion;

said flutes being shallow relative to a diameter of said tool defined by said peripheral cutting edges, thereby substantially preventing chattering during horizontal cutting and chamfering operations.

2. A cutting tool as defined in claim 1 including a tertiary clearance for each of said radial cutting edges adjoining said respective secondary clearances.

3. A cutting tool as defined in claim 1 wherein said radial cutting edges are disposed at a 90° included angle relative to each other as viewed in a plane containing the axis of the tool.

4. A cutting tool as defined in claim 2 including respective gashes trailing said secondary and tertiary clearances of each of said radial cutting edges, said gashes inclined with respect to said axis and respectively adjoining said respective secondary and tertiary clearances of said radial cutting edges.

5. A cutting tool as defined in claim 4 wherein said gashes respectively intersect said convex and concave portions of said flutes.

6. A cutting tool as defined in claims 4 or 5 including first and second leading tip surfaces respectively adjoining said radial cutting edges and said gashes.

7. A cutting tool as defined in claim 6 wherein said gashes and said leading surfaces form an included angle exceeding 90° viewed in an axial plane.

8. A cutting tool as defined in claim 1 wherein said radial cutting edges intersect opposite ends of said line defining said chisel tip.

9. A cutting tool as defined in claim 1 wherein said primary clearance of each of said peripheral cutting edges intersects said primary clearance of said respective radial cutting edges, and said secondary clearance of each of said peripheral cutting edges intersects said primary and secondary clearances of said respective radial cutting edges.

10. A cutting tool as defined in claim 6 wherein said gashes and said leading surfaces respectively intersect said concave portion of said respective flutes.

11. A cutting tool as defined in claim 6 wherein said first leading tip surface adjoins one of said respective gashes, one of said radial cutting edges, a trailing edge of said primary clearance of the other of said radial cutting edges, and said concave portion of one of said flutes.

12. A cutting tool as defined in claim 11 wherein said first leading tip surface forms an acute angle with said primary clearance of said one of said radial cutting edges.

13. A cutting tool comprising:

a substantially cylindrical body having a first end, a second end, and a longitudinal axis;

a cutting tip defined at said first end of said cylindrical body, said tip including first and second radial cutting edges, each of said radial cutting edges being inclined with respect to said axis;

a first leading tip surface, a first primary clearance adjoining said first leading tip surface along a line defining said first radial cutting edge, a second leading tip surface;

a second primary clearance adjoining said second leading tip surface along a line defining said second radial cutting edge;

a first secondary clearance adjoining said first primary clearance along a trailing edge thereof;

a second secondary clearance trailing said second primary clearance along a trailing edge thereof;

said first leading tip surface adjoining said trailing edge of said second primary clearance;

said second leading tip surface adjoining said trailing edge of said first primary clearance;

first and second peripheral cutting edges extending helically about said cylindrical body, said first peripheral cutting edge adjoining said first radial cutting edge at a first interface, said second peripheral cutting edge adjoining said second radial cutting edge at a second interface;

said first and second peripheral cutting edges being separated by first and second spiral flutes, each of said flutes including a relatively large convex surface portion and a relatively small concave surface portion;

a first helical primary clearance, said concave surface portion of said first spiral flute adjoining said first helical primary clearance along a line defining said first peripheral cutting edge;

a second helical primary clearance, said concave surface portion of said second spiral flute adjoining said second helical primary clearance along a line defining said second peripheral cutting edge;

first and second secondary helical clearances adjoining, respectively, said first and second helical primary clearances in trailing positions relative thereto;

a first gash inclined with respect to said axis and adjoining said first leading tip surface, said second secondary clearance, said convex portion of said first spiral flute, and said concave portion of said first spiral flute;

a second gash inclined with respect to said axis and adjoining said second leading tip surface, said first secondary clearance, said convex portion of said second spiral flute, and said concave portion of said second spiral flute; and said flutes being shallow relative to the diameter of said cylindrical body as measured at said peripheral cutting edges.

14. A cutting tool as defined in claim 13 wherein said first leading tip surface and said first primary clearance form an acute angle therebetween, and said second leading tip surface and said second primary clearance form an acute angle therebetween .

15. A cutting tool as defined in claim 14 including first and second tertiary clearances adjoining, respectively, said first and second secondary clearances of said radial cutting edges.

* * * * *